United States Patent
Mullen et al.

(10) Patent No.: US 8,228,038 B2
(45) Date of Patent: Jul. 24, 2012

(54) POWER MANAGEMENT CONTROL SYSTEM AND METHOD

(75) Inventors: Kevin R. Mullen, Portland, OR (US); Kuriappan P. Alappat, Portland, OR (US); Don J. Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 365 days.

(21) Appl. No.: 12/646,139

(22) Filed: Dec. 23, 2009

(65) Prior Publication Data
US 2011/0148383 A1 Jun. 23, 2011

(51) Int. Cl.
*H02J 7/00* (2006.01)
*H02J 7/06* (2006.01)
(52) U.S. Cl. ............... 320/135; 320/162; 320/164
(58) Field of Classification Search ........... 320/135
See application file for complete search history.

(56) References Cited

U.S. PATENT DOCUMENTS

| 6,127,809 A * | 10/2000 | Kates et al. | 320/134 |
| 6,184,660 B1 * | 2/2001 | Hatular | 320/141 |
| 2003/0188210 A1 * | 10/2003 | Nakazato | 713/320 |
| 2005/0040787 A1 * | 2/2005 | Choi | 320/103 |
| 2008/0150488 A1 * | 6/2008 | Lu et al. | 320/134 |
| 2009/0295334 A1 * | 12/2009 | Yang et al. | 320/134 |

OTHER PUBLICATIONS

WO 2009/004284 Turner et al., (Turner), Battery Recharging, Jan. 8, 2009, pp. 5-6,14.*

* cited by examiner

*Primary Examiner* — M'Baye Diao
(74) *Attorney, Agent, or Firm* — Ked & Associates LLP

(57) ABSTRACT

A power management system includes a sensor to detect current output from a battery, a first comparator to compare the battery current to a first reference value, and a burst controller to perform a first power control operation based on said comparison. The power control operation reduces power consumed by the battery in order to cause the battery current to fall below the first reference value. This may be accomplished by reducing or shutting down power to one or more functions or features of a host system that includes or is coupled to receive power from the battery. The host system may include or correspond to a mobile phone and/or any of a number of other electronic devices.

34 Claims, 7 Drawing Sheets

POWER MANAGEMENT CONTROL SYSTEM AND METHOD

FIELD

One or more embodiments disclosed herein relate to managing power in an electronic device.

BACKGROUND

Power management has been a driving force in the design of many electronic devices, especially those that are battery powered. One form of power management focuses on protecting against over-current, over-voltage, or other signal or power aberrations that can produce circuit damage and/or present a safety risk. Existing techniques for addressing these issues have drawbacks.

DETAILED DESCRIPTION

One or more embodiments of the present invention cover systems and methods for controlling power from a power source. The power source may be any type of power source used to operate an electronic device. According to embodiment, the power source may be a battery for powering a mobile phone, media player, netbook, smartphone, iPod, personal digital assistant, notebook computer, or other mobile or processing device. In other embodiments, the power source may be a voltage regulator, converter, solar power source, hybrid power circuit, or other type of current and/or voltage circuit for supplying power. For the sake of illustration, in the embodiments discussed below, the power source will be assumed to be a battery for powering a mobile phone.

Figure 1:
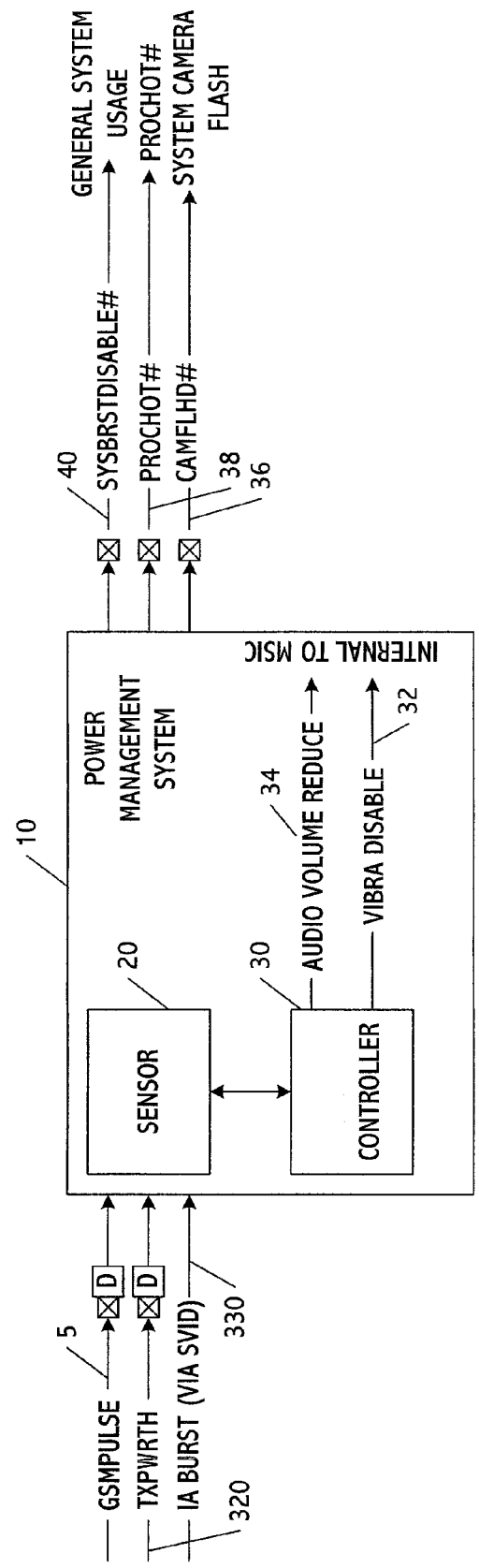
FIG. 1 is a diagram showing one embodiment of a power management system.

FIG. 1 shows a power management system in accordance with one embodiment of the present invention. The power management system may be implemented as or include a control system for regulating the amount of power consumed by a battery. In one illustrative application, the system may reside on one or more chips or dies in or coupled to a mobile phone.

According to one application, the control system of the present embodiment is responsible for ensuring that current does not exceed a maximum level allowed by the battery. Exceeding this level may produce a high battery discharge current which can damage the phone or user and cause a loss in rated capacity. To compensate, the mobile phone may include software routines and/or hardware circuits to monitor and prevent the battery from discharging at the maximum current level.

The potential for exceeding the allowable maximum current is increased by current from sources other than the mobile phone battery. For example, additional sources of current, or current draw, include the modulation/demodulation (modem) circuits of the phone, camera flash, system-on-chip (SOC) circuits, and external hands-free speakers to mention a few. These and other sources of current, or current draw, may cause the maximum allowable discharge current (e.g., 3A) or rated capacity to be exceeded.

As explained in detail below, the control system of the present embodiment will take a multi-faceted approach to controlling current in the mobile phone. This approach will involve reducing or shutting down power (e.g., current draw and/or voltage) to one or more circuits or phone features, in order to reduce power consumption to an acceptable operating range.

As shown in FIG. 1, the control system 10 includes a sensor 20 and controller 30. The sensor monitors current from the battery and this current is then compared to one or more predetermined reference values. The reference values may be limit or threshold values stored in one or more corresponding registers and may include current and/or time values. The current may be monitored by the sensor in real-time, near real-time, or at predetermined time periods, and according to one non-limiting example may be considered a burst current.

The reference values may be determined, for example, based on design specifications of the battery and/or mobile phone. According to one application, the reference values may correspond to an over-current or other protection condition. According to another example, the reference values may correspond to high-current condition. According to another example, the reference values may correspond to a low-battery voltage condition. According to another example, the reference values may correspond to preset values that trigger one or more power management operations, described below. Another application may include a combination of these values.

To assist in obtaining these values, battery identification information and/or reference values may be read from an internal storage when the mobile phone starts up (e.g., is turned on), transitions from a sleep or low power state to a higher power state, or at system boot or re-boot, according to programmable control.

As an example, the following operations may be performed based on the comparison of the current monitored by the sensor. A status signal may be output from the sensor to the burst controller in order to initiate these operations. Alternatively the controller may perform the comparison based on a status signal from the sensor which provides an indication of the amount of monitored current.

(1) Power control operation (programmable)
(2) Measure active battery voltage (Vbat) current and compare to a battery current ceiling limit (programmable)
(3) Measure time the active battery voltage is above or allowed over the ceiling limit (programmable) time before system shutdown (programmable)

In alternative embodiments, power control operations may be performed when battery voltage goes below one or more predetermined set of voltage values. In these same embodiments, timers may be started in a similar manner described herein based on a comparison to these predetermined voltages.

The burst controller 30 performs one or more power control operations based on the status signal from the sensor. These power control operations include one or more of the following.

Vibration Disable. One power control operation involves limiting power for use in enabling a system vibration function of the mobile phone during high battery-current conditions, one of the situations corresponding to (1)-(3), and/or one of the other aforementioned conditions. This may be accomplished, for example, by the controller outputting a signal (Vibra Disable) 32 to a vibration control circuit to disable a vibration function of the phone at least for a predetermined time. The predetermined time may be a set or programmable period of time or may be until the status signal from the sensor falls into an acceptable range of operation, e.g., detects that the current output from the battery has returned to an acceptable range or a value below the reference value indicative, for example, a high-current, over-current, over-voltage, or low-battery condition.

Additionally, or alternatively, the controller may output a signal to lower the power for use in operating the vibration control unit. This may involve, for example, performing the vibration function at a lower frequency or rate of vibration. Either way, by disabling or lowering the vibration function, the amount of power consumed from the battery is reduced.

Audio Disable. Another power control operation involves limiting power for use in enabling an audio function of the mobile phone during a high battery-current condition, one of the situations corresponding to (1)-(3), or one of the other aforementioned conditions. This may be accomplished, for example, by the controller outputting a signal (Audio Volume Reduce) 34 to an audio control or audio amplifier circuit to disable an audio function of the mobile phone for at least a predetermined time. The predetermined time may be a set or programmable period of time or may be until the sensor detects that the status signal from the sensor falls into an acceptable range of operation, e.g., detects that the current output from the battery has returned to an acceptable range or a value below the reference value indicative, for example, a high-current, over-current, over-voltage, or low-battery condition.

Additionally, or alternatively, the controller may output a signal to lower the power for performing the audio function. This may involve, for example, supplying some predetermined fraction (e.g., ½) of power lower than is supplied to the audio control or amplifier circuit during a normal state of operation, e.g., when current output from the battery is lower than the reference value or when some other condition is not triggered. By disabling or lowering the power used to drive the audio function, the amount of power consumed from the battery is reduced.

Camera Flash Disable. Another power control operation involves reducing power to or disabling a camera flash of the mobile phone during a high battery-current condition, one of the situations corresponding to (1)-(3), or one of the other aforementioned conditions. This may be accomplished, for example, by the controller outputting a signal (camflhdt#) 36 to alter operation of the camera and/or camera flash, to thereby ensure that less battery power is consumed. The controller signal may also be output in response to a global signal for mobile (GSM) communications pulse signal 5 generated within the phone.

While this application uses GSM-type communications, other communication protocols may be used including but not limited to code-division multiple access (CDMA), time-division multiple access (TDMA), a Third Generation (3G) for Fourth Generation (4G) protocol, or any one of a variety of other protocols used to support mobile data and voice communications.

Control IA Burst Mode. Another power control operation involves limiting power to one or more other components of the mobile phone during a high battery-current condition, one of the situations corresponding to (1)-(3), or one of the other aforementioned conditions. This may be accomplished, for example, by the controller outputting a signal (prochot#) 38 to reduce operation of a processor to a lower frequency mode (LFM) of operation, to thereby ensure that less battery power is consumed.

A prochot signal is one that may be used to initiate an operation performed by a thermal or other type of control circuit of a processor (e.g., Intel's Pentium 4 processor). When used for thermal control, the circuit receiving the prochot signal may be activated to perform a protection operation when a maximum safe operating temperature has been reached or exceeded. As an alternative, and in accordance with at least one embodiment of the present invention, the PROCHOT signal may be output to lower processor frequency or perform a protection operation when a non-thermal event occurs. Either way, by lowering burst mode control in this manner, the amount of power consumed from the battery is reduced.

System Component(s) Control. Another power control operation involves limiting power to one or more other components of the mobile phone during a high battery-current condition, one of the situations corresponding to (1)-(3), or one of the other aforementioned conditions. This may be accomplished, for example, by the controller outputting a signal (sysbrstdiable#) 40 to disable burst power to one or more system components including but not limited to a general purpose input/output (GPIO) circuit, a platform component, or circuits that perform NON-PROCHOT actions.

As previously indicated, a PROCHOT action may correspond to an operation performed by a thermal control circuit of a processor, which circuit is designed to be activated, for example, when a maximum safe operating temperature has been reached or exceeded. By disabling burst power in this manner, the amount of power consumed from the battery is reduced.

The aforementioned power control operations may also be performed under one or more of the following additional conditions. First, GSM blanking for global positioning system (GPS) and handheld digital video broadcasting (DVB-H) functions may be performed based on a direct connection of a modem to GPS and DVB-H subsystems, in order to relay information outside of the controller to other circuits of the mobile phone or components of the mobile network.

Second, requested inputs, outputs, and registers are made available for use inside of the mobile system integrated circuit (MSIC) embodying and/or implementing the functions of the power management system.

Third, the values stored in limit and/or other registers of the phone may be programmed at boot time, in order to set parameters for performing power management control.

Fourth, all logic flows (including but not limited to power management control) may have the ability to be individually disabled based, for example, on the values stored in one or more registers.

Figure 2:
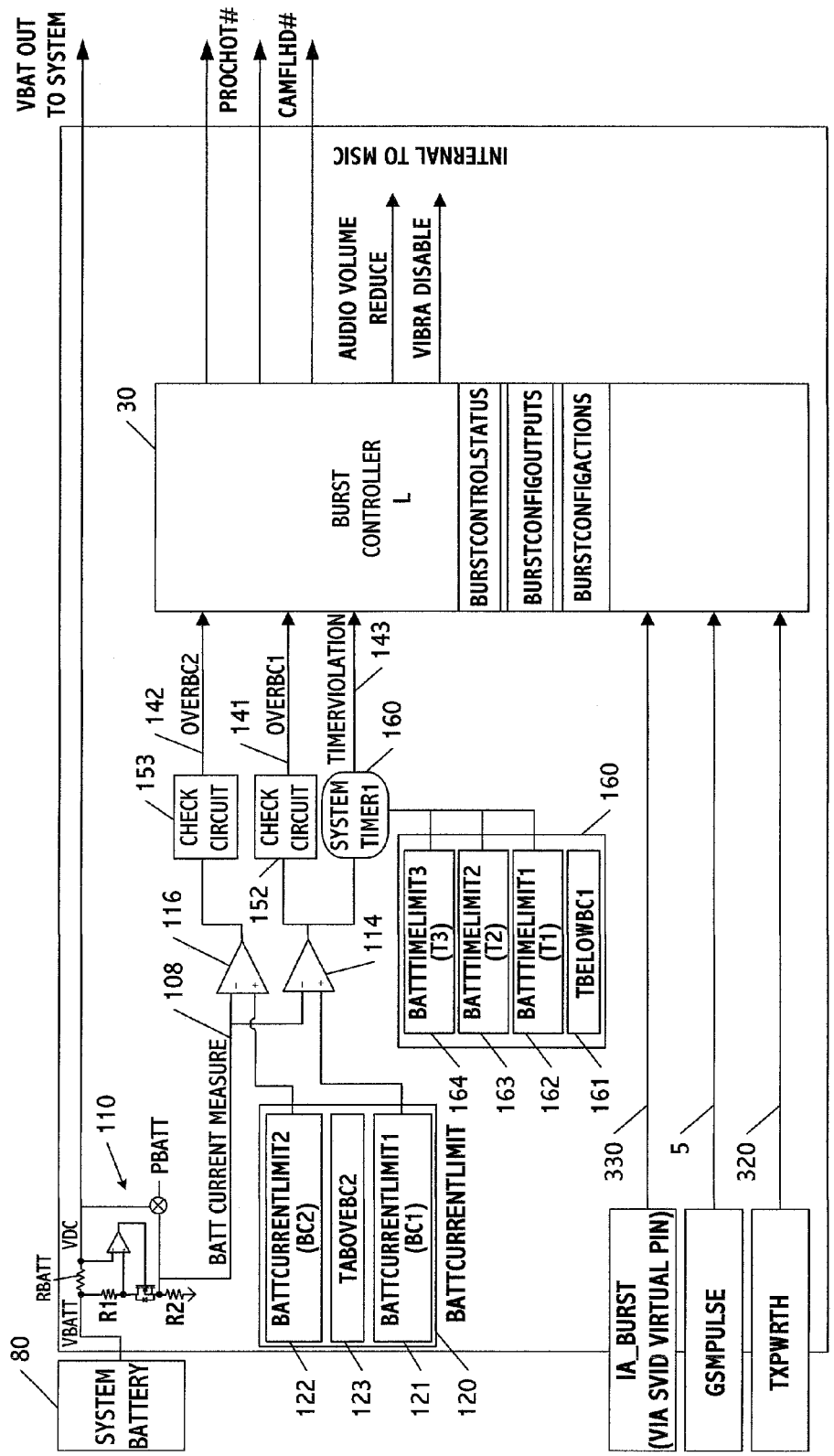
FIG. 2 is a diagram showing one embodiment of a burst control system which may correspond to the power management system shown in FIG. 1.

FIG. 2 shows a more detailed view of the burst control system of FIG. 1, which is coupled to a battery 80 for powering one or more circuits of the mobile phone and operates by monitoring system requirements based on battery current draw. One or more control signals may then be generated based on the drawn current and on system state knowledge.

According to one application, system requirements may be monitored based solely on battery current draw.

As shown, the system includes a battery current detector 110, a first set of registers or storage circuits 112, comparator circuits 114 and 116, a second set of registers or storage circuits 120, and burst controller 30. The battery current detector outputs a signal 108 which provides an indication of the current drawn by or output from the battery. This signal may be generated in real-time according to one application.

The comparator circuits compare the battery current signal to one or more reference values. To minimize the possibility of a maximum battery current threshold being violated, the battery current signal may be compared to two reference values stored in the first set of registers 121 and 122. These two reference values correspond to the limits of concern pertaining to battery current. For example, a first reference value (battcurrentlimit1) stored in register 121 provides an indication of a high-current condition and a second reference value (battcurrentlimit2) stored in register 122 provides an indication of a higher current condition that warrants system shut-down.

The first comparator circuit 114 compares the battery current signal to the first reference value stored in register 121. Based on this comparison, a system timer 130 may be activated in order to track how long the battery current is above the first reference value, e.g., battery current threshold battcurrentlimit1. This tracking (or timing) function is performed to eliminate a false indication of serious excessive battery current draw. For example, some battery current spikes are simply glitches that can be managed or are temporary in nature.

The system timer 130 plays the role of watchdog to rule out these cases. In one embodiment, if the battery current indicated by signal 108 remains equal to or above the first reference value for a certain period of time (which, e.g., may be set or programmed into the system timer), the system may be considered to be headed toward battery shutdown if no action is taken.

The second comparator circuit 116 compares the battery current signal to the second reference value stored in register 122. Based on this comparison, one or more power control operations will be performed as discussed in greater detail below.

The reference values and other parameters (e.g., system current settings, system timer periods, etc.) used by the sensor control block to perform these operations may be programmable and/or changeable to provide for maximum system flexibility. Based on the outputs of the comparator circuits and/or system timer, burst controller 125 may generate a signal for performing one or more of the power control operations previously mentioned.

For example, the burst controller may generate a signal (camflhd#) to disable the ability to use or charge the camera flash. An audio volume reduce signal or prochot#, or vibra disable signals may also be output from the burst controller to perform corresponding operations.

In terms of internal logic flow, one or more power control operation may involve generating a hardware interrupt, via GPIO, to a processor in order to initiate a software routine or diagnostic circuit in an attempt to correct the over-current condition or to otherwise control the system, while the system is continually monitored for time and/or current violations. This can also be accomplished via an interrupt or other form of feedback signal.

If system current does not come down quickly to below one or both reference values and/or the system timer hits a flag point or otherwise times out, burst controller 30 may shut down all high-current functions (like vibration and high-volume audio operations) and/or limit burst capability until the over-current condition has been resolved, for example, by the diagnostic software or functions performed by one or more protection circuits (which, for example, may place the operating circuits of the mobile phone is a low-voltage, low-current, reboot, or shut-down condition).

If the system current is still too high after a maximum time limit expires and/or at any point the system battery current goes above the maximum allowable limit (which, for example, may correspond to the second reference value (battcurrentlimit2)), a shut-down operation may be immediately performed based on, for example, a control signal from controller 30.

A more detailed description of the reference values and control signals which used for operation of the battery current sensor block will now be provided.

BATTCURRENTLIMIT1. This is a current reference or limit value that may, for example, correspond to an initial threshold of battery current indicative of a possible warning condition. This value may be set at some predetermined range below a preset maximum current value when a system shut-down is required or otherwise which corresponds to when the current is so high that system damage may result or is impending.

According to one embodiment, reference value battcurrentlimit1 (or BC1) may be set far enough below the preset maximum battery current capability so that there is adequate time to signal the other circuits in the system (e.g., mobile phone) that changes are required before system operation is negatively impacted. For example, battcurrentlimit1 may be set upon initial boot of the system and have a default value of 3 amps.

When comparator circuit 114 this reference value has been exceeded, a first error signal (overbc1) 141 is output to the burst controller. The burst controller then waits to receive a signal from system timer 130, which is started when reference value battcurrentlimit1 has been exceeded). If the timer exceeds a predetermined time period (indicated below), an error signal 143 is output to the burst controller, which then outputs a control signal for initiating a diagnostic procedure to correct the over-current position. The burst controller may also output one or more of the power control signals (e.g., Audio volume reduce, vibra disable, prochot#, camflhd#, etc.) under these circumstances to reduce consumption of power from the battery under these circumstances.

Before the system timer is started, error signal 141 may be passed through a check circuit 152 to determine whether hysteresis effects caused the battcurrentlimit1 value to be exceeded. The purpose of determining whether there is hysteresis is to filter out glitches or unwanted, negligible, or unintended signal transitions (e.g., logical highs or lows) that might signify a false start to the timer circuitry. Even if there is no hysteresis, other aberrations may cause the timer to start inadvertently. The check circuit may provide an indication of whether an over-current condition is valid (e.g., attributed to one of these erroneous conditions), and if so to compensate for these errors.

TBELOWBC1. This value is stored in a register 161 of the second set of registers previously mentioned. This value may be a preset or programmable value which controls when the system timer should be reset based on the output of the comparator circuit 114. According to one application, the value tbelowbc1 may provide provides an indication of a minimum time the battery current signal is below the battcurrtlimit1 reference value (BC1) in order for system timer to reset, i.e., if the battery current signal is below this reference value for a time equal to or less than tbelowbc1, then the over-current condition may be attributable to some current glitch and the system timer may automatically be reset. A non-limiting example of tbelowbc1 may be 2.8 milliseconds.

BATTCURRENTLIMIT2. This reference value (BC2) corresponds to some predetermined maximum threshold of battery current, which is to be set a predetermined level below an absolute maximum battery current capability (e.g., in order to prevent a battery over-current protection function from being enabled that will shut-down the system) but above is above the reference value of battcurrentlimit1.

The value of battcurrentlimit2 may be set upon initial boot of the system and, for example, may have a default value of 3.8 amps. As shown in FIG. 2, when the output of comparator circuit 116 determines that the battery current has exceeded the value of battcurrentlimit2, the comparator circuit may output an error signal 142. In response to this error signal, the burst controller may generate a control signal to shutdown the one or more circuits of the system or the entire system, either immediately or within some period of time. This may include generating a system interrupt and activating all system burst disables within the system control. Alternatively, one of the other power control signals (e.g., Audio volume reduce, vibra disable, prochot#, camflhd#, etc.) may be generated under these circumstances.

Before this occurs, error signal 142 may be passed through a check circuit 153 to determine whether hysteresis effects caused the battcurrentlimit2 (BC2) value to be exceeded. The check circuit, therefore, provides an indication of whether the over-current condition is valid.

TABOVEBC2: This is value stored in register 123 which provides an indication of a minimum time which the battery current signal may be above the second reference value (BC2 or battcurrentlimit2) before an emergency battery over-current condition is determined to exist. If such a condition exists, the burst controller may force a system shutdown. This may be considered a last line of defense from a current perspective before a built-in battery over current-protection circuit (included or coupled to controller 30) turns on and completely disables the battery output. The value of TABOVEC2 may have a default register setting of 10× real-time clock (RTC) microseconds, but this value may otherwise be programmable.

In at least one application, the RTC may be a frequency of 32.768 kHz. The Real Time Clock may be controlled to always run whether the system is powered off or on and may be used throughout the platform for sleep and steady state clock synchronization, and timing.

The value TABOVEC2 is used by the system timer. According to one embodiment, the system timer may be an independent timer using the TABOVEBC2 register setting and may be started once the BATTCURRENTLIMIT2 is exceeded. If the timer counts up to the TABOVEBC2 threshold, the system shall run a SHUTDOWN sequence for the platform.

BATTTIMELIMIT1. This is a reference value stored in register 162 used to generate a first flag signal from the system timer indicating that the battery current signal has been above the first reference value (battcurrentlimit1, or BC1) for a first predetermined period of time (T1). When this occurs, a GPIO signal (or interrupt) may be generated to activate a software program or diagnostic circuit to correct the over-current condition, if possible. The GPIO signal may be output from burst logic controller 30 in response to a control signal output from the burst logic control block. The controller may perform the corrective operation or this operation may be performed by another processing circuit.

According to one embodiment, controller 30 initiates corrective action by generating signal SYSDISABLEBURST# shown in FIG. 1, which signal is sent to GPIO control circuit. The corrective action may correspond to or be accompanied by performance of one or more of the power control operations previously described.

Note that T0 would be the time the system timer is started and the battery current crosses the threshold set by BATTCURRENTLIMIT1. Also, this and other timers may be affected by the TBELOWBC1 register settings as well, as part of validating that a high current detection is valid.

Violation of the T1 period may cause the timer to output an OVERT1 error signal to a BRSTCONTROLSTATUS register and to send an interrupt to the CHRINT register (bit D1).

BATTTIMELIMIT2: This is a reference value stored in register 163 used to generate a second flag signal from the system timer indicating that the battery current signal has exceeded the first reference value (battcurrentlimit1) for a second predetermined period of time (T2), longer than T1. When this occurs, the burst controller outputs signal(s) to activate one or more high-current subsystems of the mobile phone, for example, via hardware.

These signals include, for example, SYSDISABLEBURST# which is output to the GPIO circuit, the CAMFLHD# signal to limit the ability to charge or activate the camera flash, and an internal signal AUDIOVOLUMECRUSH to the audio volume control subsystem to limit the system audio volume. Additionally, a VIBRADISABLE# signal may be generated to lower the power to or shut down the ability to use the vibrators temporarily. Violation of this time period T2 may cause an OVERT2 status to be set in the BRSTCONTROLSTATUS register and, for example, may also be used to send an interrupt to the CHRINT register (bit D1) in some mobile phone platforms. Alternatively, an interrupt signal may be sent to a central command and control processor to be used as a system wide interrupt that needs servicing.

BATTTIMELIMIT3. This is a reference value stored in register 164 used to generate a third flag signal from the system timer indicating that the battery current signal has exceeded the first reference value BATTCURRENTLIMIT1 for a third predetermined period of time (T3), longer than T1 and T2. When this occurs, the timer outputs a signal to the burst control logic block to output a control signal to initiate a system shutdown. The shutdown may involve generation of the SYSDISABLEBURST# signal coupled to the GPIO circuit, the CAMFLHD# signal to limit the ability to charge or activate the camera flash, the internal signal AUDIOVOLUMECRUSH to the audio volume control subsystem to limit or shut off the system audio volume, and the VIBRADISABLE# signal to the vibrator enable gates to shut down the ability to use the vibrators temporarily. Violation of the T3 condition may cause an OVERT3 status to be set in the BRSTCONTROLSTATUS register and may also be used to send an interrupt to the CHRINT register (bit D1).

IABURST. This is a logical signal input from a control circuit of the mobile phone via, for example, virtual pin on a serial voltage identification (SVID) or other type of bus. This input can be acquired by data packet transmission across the SVID interface. The existence of a CPU burst mode is contained in virtual pin bit position 6, and is expected to be set or disabled whenever the CPU is requested to go into or out of burst mode, which is accompanied by a change in system frequency and therefore, voltage. This signal will need to be latched once received for proper combination logic application to happen. For example, logic 0=normal CPU mode and logic 1=CPU in burst mode.

The SVID or other bus may be used for requesting voltage changes from external voltage regulators and controllers. This bus may also be used to communicate back to a host processor changes in voltage regulator states, as well as receive other information such as IABURST.

CAMFLHD#. This signal is output to control the camera flash circuit to limit the ability to charge or activate the camera flash of the mobile phone.

SYSBURSTDISABLE#. This signal is output to system level components and serves as a GPIO input to signify that an over-current condition requiring system level assistance is needed. Sending this signal may also trigger an interrupt to the system controller unit (SCU). The SCU may be a small state machine and functional logic block with embedded software control that resides inside the host System on Chip (SOC).

The SCU may control communications to and from other components in the system, whether the phone platform is turned on or not. It may be also considered as a sub-layer of embedded control that does not rely on the host processor running an actual operating system such as Linux. It may further function to set up and run a host system as a protected, embedded controller that the Operating System communicates with in order to configure and run hardware components on a platform.

PROCHOT#. This signal is used to signify that an IA burst must be disabled and that the system may be configured for LFM mode. This signal may be used in combination with SYSBURSTDISABLE and MSIC interrupt (SVID) capabilities to denote what happened, e.g., the cause of the over-current condition. Sending this signal may also trigger an interrupt to the SCU. This signal may also be referenced as SOCBURSTDISABLE# or SOCPOWERCONTROL in this document but pin map supersedes these names.

BURSTCONTROLACTION. This information indicates what system limitations were imposed before an interrupt signal was sent to the SOC circuit for processing. This information may be used with a time violation of BATTTIME-LIMIT2 (T2) where the system had to take control over the high current devices, but is not intended to shut down the system yet. Details of this register contents are in the table in the register section.

Figure 3:
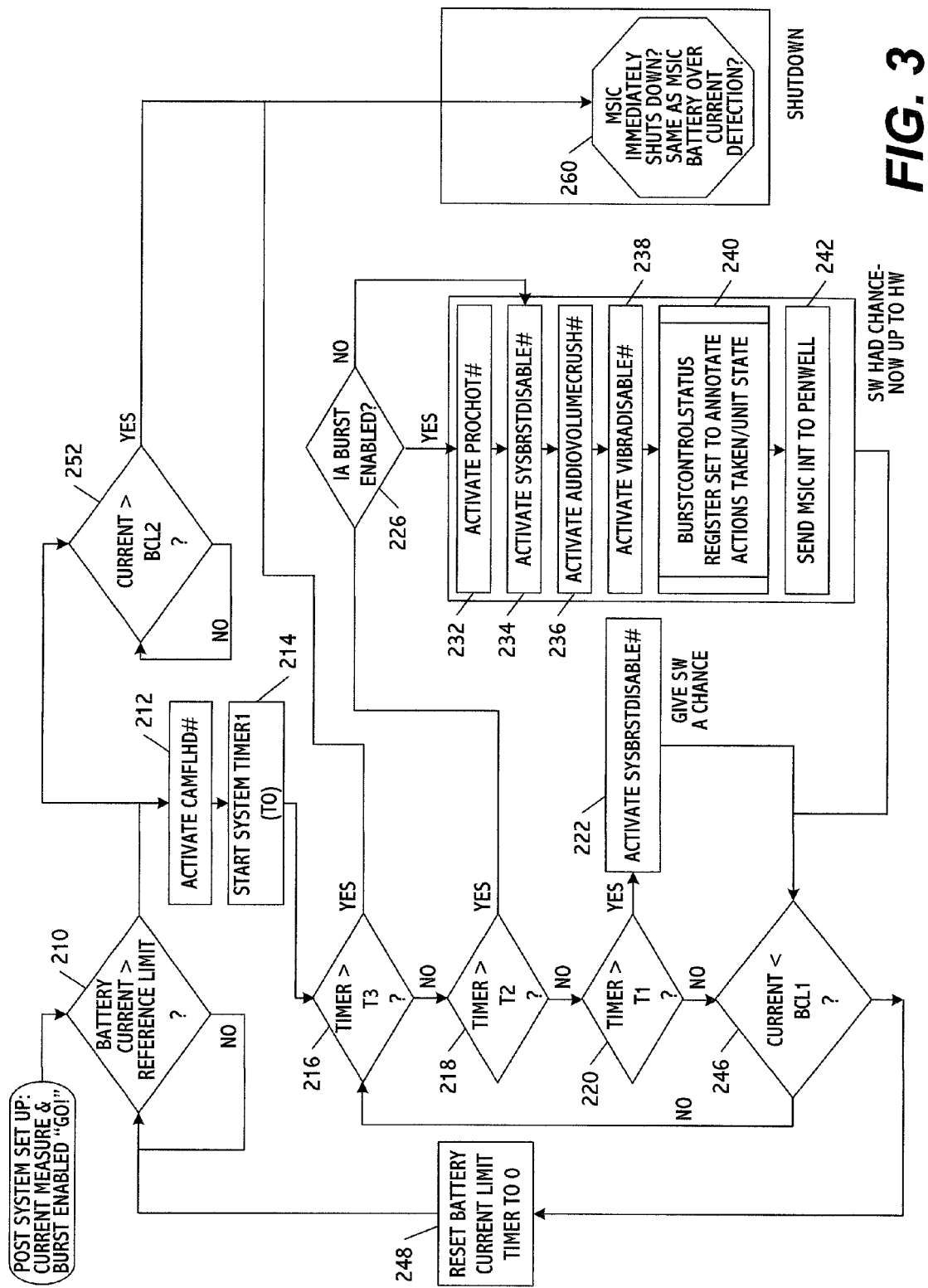
FIG. 3 is a diagram showing operations included in one embodiment of a power management (or burst control) method.

FIG. 3 provides a more detailed indication of operations that may be performed when a battery over-current condition occurs or when a system timer limit is exceeded. As previously explained, comparator circuits 114 and 116 monitor the battery current against reference values stored 121 and 122, namely BC1 and BC2. Input tolerance may be designed to be sufficiently low to allow for minimal leakage current, but at the same time may provide as tight of tolerance around the target current as possible or to within predetermined ranges.

In a first operation, a determination is made as to whether battery current is above reference value BC1. (Block 210). If no, the battery current continues to be monitored on a continual basis or according to predetermined time increments. If yes, then the signal CAMFLHD# is generated to prevent the camera flash from activating (Block 212) and then system timer 130 is started to keep track of how long the battery current signal is above BC1 (Block 214).

In generating and processing these signals, the camera subsystem may be controlled so that it is not allowed to utilize the flash at the exact same time that the signal is going into a high-current mode. If the reference value BATTCUR-RENTLIMIT1 (BC1) is considered to be a hard limit for controlling system operation, then the camera flash may be considered a first priority to be disabled whenever this limit is reached. Even if the camera flash is not scheduled to be active, this action at the very least may be viewed as a precautionary measure. Recovery from this state may be anytime the measured current value goes below BC1. When this occurs, the camera flash may be enabled once again, i.e., the output to the CAMFLSHD# pin is not latched.

Based on the output of comparator circuit 114, the system timer initiates an action to keep track of how long the system is above BC1. This action involves comparing the timer to the time periods T1, T2, and T3 in seriatim. (Blocks 216, 218, and 220 respectively). Understanding that there might be some level of noise immunity required, the system may validate the input signal by comparing the system timer progress to the setting of TBelowBC1, which will determine whether the signal is truly a "glitch" or something that is requires system intervention.

If the battery current is below BC1 for longer than TBe-lowBC1, then the battery current that existed prior to the start of the timer should be considered a duration that is manageable by the battery and the timer should be reset to wait for the next violation of BC.

If the battery current goes below BC1 for a shorter duration than set by TBelowBC1 and returns to a measured value above BC1, then the battery current that existed prior to the start of the timer should not be considered a duration that is manageable by the battery and the timer should continue counting up to BATTTIMELIMIT1 (T1).

Interrupt signals from burst controller 30 are generated based on system timer violations. These signals may be input into a D1 pin/bit of a CHRINT register to denote a battery over-current issue. A timer violation occurs whenever the battery current has met or exceeded reference value BC1 for periods T1, T2, and T3.

When the battery current is detected to be equal to or above BC1 for time period T1, a timer violation signal will propagate through combination logic and activate system level signals such as SYSBRSTDISABLE#. (Block 222). A software program or diagnostic circuit may then be activated in attempt to fix the problem which caused the over-current condition.

When the battery current is detected to be equal to or above BC1 for time period T2, a determination is made as to whether an IA burst has been enabled. (Block 226). If so, one or more of prochot#, sysbrstdiable#, audiovolumecrush#, and vibradiable# signals are generated to lower the power consumption of the battery, in an attempt to lower the current draw to below BC1. (Blocks 232, 234, 236, and 238).

A burst control status register may then be set to provide an indication of actions taken and the states of one or more units of the mobile phone. (Block 240). An interrupt signal may then be sent to the operating system or controller of the mobile phone. (Block 242).

If an IA burst has not been enabled, then all of the aforementioned signals are generated except for the prochot# signal.

Before or during the operation in Block 226, a software routine may be activated in an attempt to correct the problem which caused the over-current condition. If the software routine has not fixed the problem by the time the operation in Block 242 has been performed, a hardware operation may be performed in an attempt to correct the over-current condition.

If the hardware operation or software routine corrects the problem and the battery current falls below BC1 (Block 246), then the system timer is reset (Block 248) and control returns to Block 210. This also happens when the battery current momentarily goes above BC1 and then falls below BC1 before the time period T1 expires.

When the battery current meets or exceeds BC1 for time period T3, then system shutdown occurs. (Block 260). Furthermore, when the BC1 value is met or exceeded, an interrupt may or may not be generated.

When the BC2 value is met or exceeded (e.g., after being validated by the hysteresis circuits), then system shutdown occurs. (Block 260). An interrupt once again may not be generated because the system should execute a shutdown sequence (see next section about BC2.)

Additionally, it is noted that when a timer violation signal output, it is transferred through the logic and therefore must be held low long enough for the receiving end to detect the edge and have the proper hold time. This is estimated to be at least 1 ms in length, but is not a problem if the system latches the output until the SW can come and read and clear the status registers for a timer violation. Since the receiving end of the BCU outputs to latch an alert signal (such as PROCHOT# and SYSBRUSTDISABLE#) and to activate a control sequence, OVERT1, OVERT2, OVERT3 status bits to be cleared by a software (SW) operation.

The timer violation status bits (OVERT1, OVERT2, OVERT3) may be added to the BRSTCONTROLSTATUS register in order to provide an indication of what occurred to cause the over-current condition. These may be set at the same time the timer violation occurs and are independent of what output functions are allowed to reach the end points (SYSBRSTDISABLE#, PROCHOT#). This way, even if the system has turned off functionality, a software (SW) operation can poll these status bits to see if there is an event that would have needed servicing. The timer violations in the status register may be cleared by writing a logic 0 value to these bit position in the BRSTCONTROLSTATUS register.

Battery current measurement BC2 may be considered the over-current condition that is the last line of defense before the system battery over-current protection logic turns on. Therefore, the system may need to shut down immediately. The BC2 measurement has one level of noise immunity by measuring the time the battery current has been above BC2 as defined by the register BATTCURRENTLIMIT12 with bits TABOVEBC2. The default settings may be 10×, 16×, 32×, and 64× the system clock, which, for example, may be 32 KHz.

As previously indicated, when the system violates the BC2 setting and this violation is validated by a corresponding one of the hysteresis circuits, an immediate battery over-current condition warranting shut down of the system may be performed in Block 260.

Figure 4:
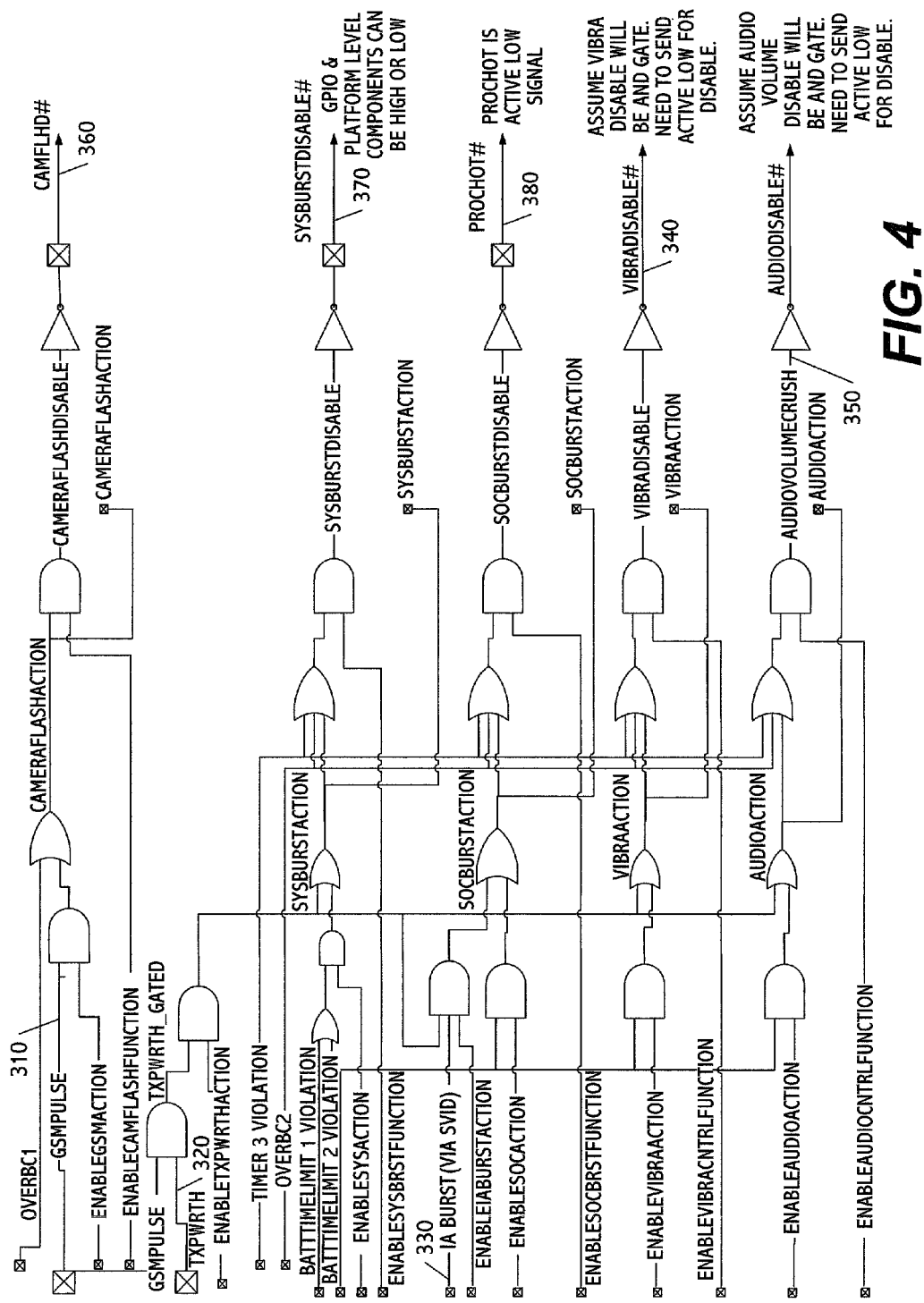
FIG. 4 is a diagram showing an example of logical operations that may be performed in implementing the system of FIG. 2 and the method of FIG. 3.

FIG. 4 shows logical functions performed by the burst control logic block in FIG. 2. This block may operate based on inputs from the modem of the mobile phone according to a combinatorial logic tree used to actively monitor high-current events. Power control functions may then be performed to correct the over-current condition, to disable certain mobile phone functions, and/or to shut the operating system of the mobile phone down if the over-current condition cannot be correct in a timely manner.

As previously described, the burst control logic block performs power control operations based on the battery current signal, the output of the battery current comparator circuits, and the system timer. A description of the power control operations and the signals generated to perform these operations is provided below:

GSMPULSE. When this signal 310 assumes a predetermined logical value (e.g., an active high signal), the burst controller configures the output response to one or more of the Audio, vibra, and camera flash circuits previously described. This signal is used to signify that the GSM is actively using the power amplifier and thus can mask (or gate) the audio, vibra, IA burst, and camera flash capabilities. This can be done independently or in combination with other system information such as MSIC knowledge of the IA burst mode. The input logic from the modem may operation with a variety of communication standards including but not limited to second generation (2G) systems. A 3G implementation is also possible using analogous logic.

TXPWRTH. When this signal 320 assumed a predetermined logical value (e.g., an active high signal), the burst control unit configures the output response to one or more of the Audio, vibra, and camera flash circuits in advance of the GSM Pulse going high. The timing of the pulse may be programmable inside the modem. To support this functionality, assumptions made at the burst control logic include that the TXPWRTH signal can be used to set up system level response to high current GSM pulses well in advance of the GSM Pulse. Since this signal is also intended to be supplied to the processor of the mobile phone, via GPIO, usage may be expected to be backup only in case of system timing issue.

IABURST. This signal 330 may be generated by input logic from the processor of the mobile phone via a virtual pin on SVID. This input can be acquired, for example, by data packet transmission across the SVID interface. The existence of processor burst mode may be contained in virtual pin bit position 6, and is expected to be set or disabled whenever the processor is requested to go into or out of burst mode, which is accompanied by a change in system frequency and therefore, voltage. This signal may be latched once it is received for proper combination logic application. According to one exemplary application, a logic 0=normal processor mode and a logic 1=processor in burst mode.

VIBRADISABLE#. This signal 340 may be an internally generated signal used to control the enable gates of a vibrator of the mobile phone when an over-current condition is detected. This signal may be generated when either of a T3 violation occurs or when the battery current signal equals or exceeds the BC2 reference value. Through signal 340, the vibrator may be shut down for a predetermined period of time. Also, using this or another signal the frequency of the vibrator may be reduced to conserve battery power and to bring an over-voltage condition out of an error range, e.g., to cause the battery current signal to fall below BC1.

AUDIOVOLUMECRUSH#: This signal 350 may be an internally generated signal used to control the audio volume control subsystem to limit the system audio volume when an over-current condition is detected. This signal may be generated when either of a T3 violation occurs or when the battery current signal equals or exceeds the BC2 reference value.

CAMFLHD#. This signal 360 may be generated to control the camera flash of the mobile phone, and more specifically to control an LED or Xenon charge or flash control circuit of the phone. Anytime the system is above the BC1 limit and an overBC1 signal is generated, it seems appropriate to limit the camera flash output. Similarly, as a preventive measure, a logical OR gate has been added to allow the GSM pulse to modulate or otherwise control the Camera Flash output. This option may have the capability of being turned off.

SYSBURSTDISABLE#. This signal 370 is generated when at timer violation T1 or T2 occurs. For a T1 violation, the signal may be tied to the processor GPIO and used for the operating system power management (OSPM) knowledge to attempt to correct or otherwise compensate for the over-current situation. The OPSM may be considered a software framework and code source written to exercise system-wide power management policy enforcement.

Signal 370 is also generated when a T2 violation occurs. Under these circumstances, hardware may need to manually shut down system level devices that require high current (if configured to do so). It also can send a signal to the processor for assistance. (The processor may be a circuit different from the burst controller or the same).

PROCHOT#. This signal 380 may be output to the processor PROCHOT pin to signify that an IA burst must be disabled and that the system is to be configured for low frequency mode (LFM) operation. LFM may be considered a state of operation of the processor that is lower in power than a normal or generation state of operation. LFM mode can be activated and deactivated based on, for example, system state, software control, and other signals or conditions.

This signal may also be used in combination with SYSBURSTDISABLE and MSIC interrupt (SVID) capabilities to provide an indication of what problem caused the over-current condition. Sending this signal may also trigger an interrupt to the SCU. This may also be referenced as SOCBURSTDISABLE in this document but pin map supersedes these names.

ENABLE . . . ACTION. The enable action signals (sysburstaction, enableiaburstaction, cameraflashaction, etc.) may be generated based on register values in order to turn on/off the ability of the combinatorial logic to influence the output of a corresponding function. These signals are applied, or withheld, where necessary, to allow for emergency override operations, such as OVERBC2 and TIMER3 violations, to reach the final output stages, provided that the ENABLE . . . FUNCTION setting is correct for the corresponding function of concern.

ENABLE . . . FUNCTION. The enable function signals (enablecamflashfunction, enablevibraaction, etc.) may be generated based on register values to turn on/off the actual output of each logic segment/function. They may also be used to mask off an output and to provide segment or functional flexibility.

Figure 5:
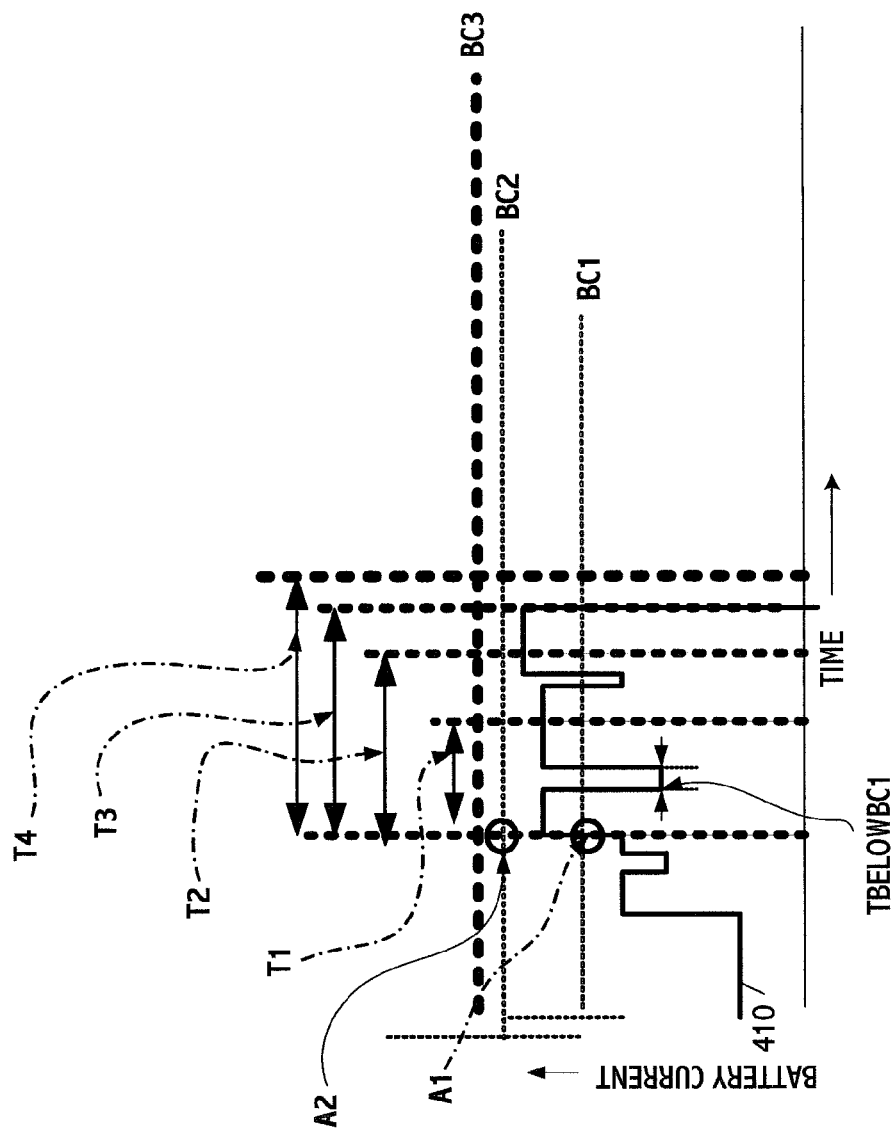
FIG. 5 is a diagram showing an example of current vs. time graph that may be used in implementing one or more of the aforementioned embodiments of the power management system and method.

FIG. 5 shows an example of how the reference values and timer periods discussed above may be used in managing burst current in the mobile phone. In this example, battery current fluctuates over time relative to three reference values. The first reference value corresponds to BC1 and the second reference value corresponds to BC2. A third reference value (BC3) corresponds to the maximum current capability for the battery over-current circuits. Unlike the first two values (which may be programmable), BC3 may be a fixed value which is battery-pack controlled.

At point A1, the battery current exceeds the first reference value, BC1. To drive the current down, one or more of the power control operations mentioned above may be performed. If the battery current were to exceed the second reference value, BC2, a system shutdown operation may be performed. While the current is above BC1, the current is continually monitored and compared against time periods T1, T2, and T3 and corresponding power control operations are performed. If the battery current is above BC1 at time period, T4, which is greater than T1 to T3, a battery protection circuit (which, for example, may be separate from the burst controller) may take over and shuts down the current from the battery.

Figure 6:
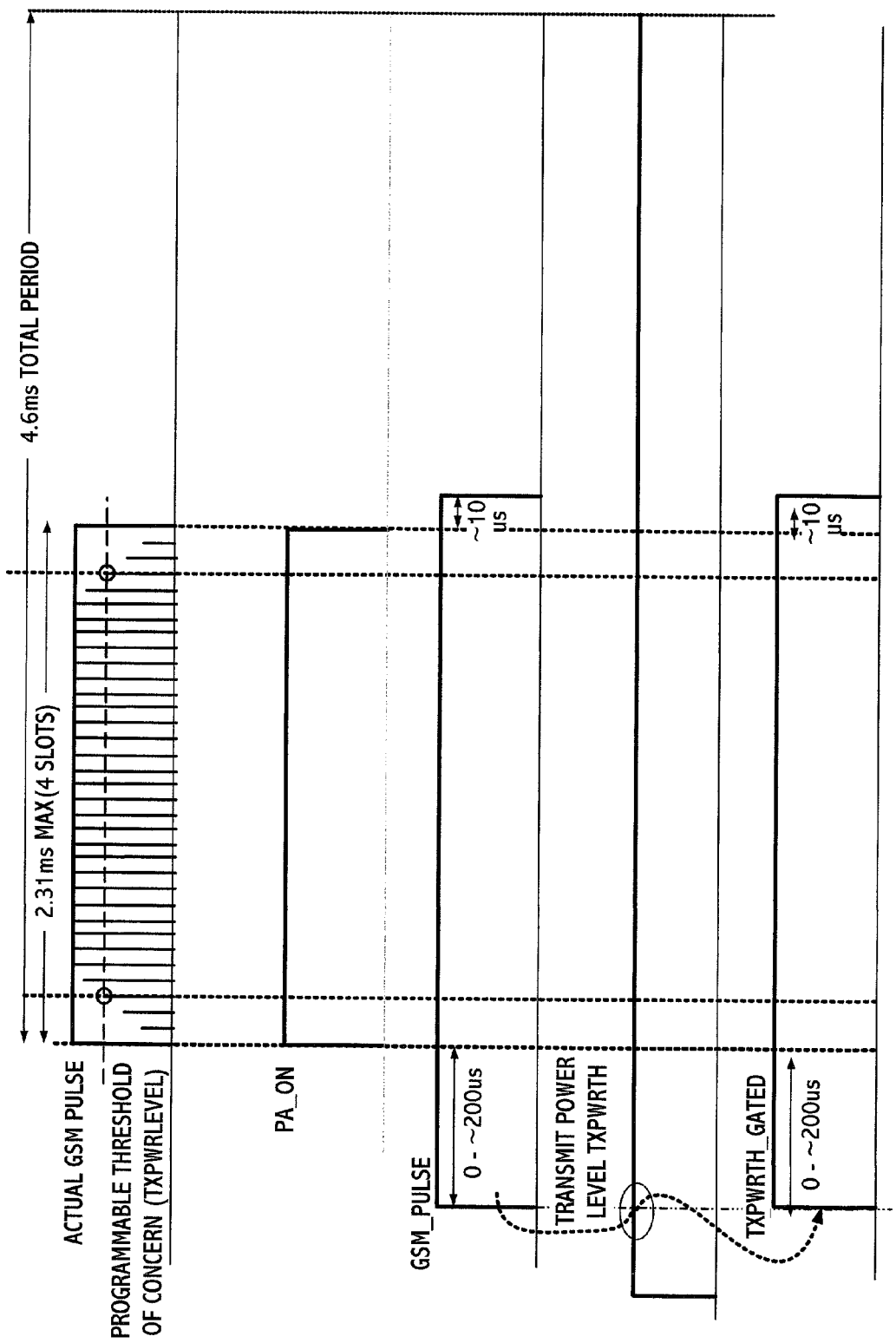
FIG. 6 is a diagram showing a pulse that may be used in accordance with one or more of the aforementioned embodiments.

FIG. 6 shows an estimated system timing diagram for signals relating to the GSM pulse. The GSM pulse may assume a substantially constant level throughout most of its duration, varying at its leading and trailing edges. TXPWRLEVEL may correspond to a threshold level reached at a predetermined point at the leading edge of the pulse and again at the trailing edge.

The amount of lead time that the TXPWRLEVEL signal provides before the actual GSM PULSE occurs in the system may improve operation of the system. While it can be optionally implemented, if it is actually used for system power management, it can provide optimization and enhanced user experience depending, for example, on the system Use Case at the time. This signal may be externally generated and have programmable flexibility in duration or to what external signal level it is attached.

The timing signals in this diagram are appropriate for 2G systems and those skilled in the art can appreciate that a similar diagram may be generated for mobile phones operating according to 3G and other communication standards.

Figure 7:
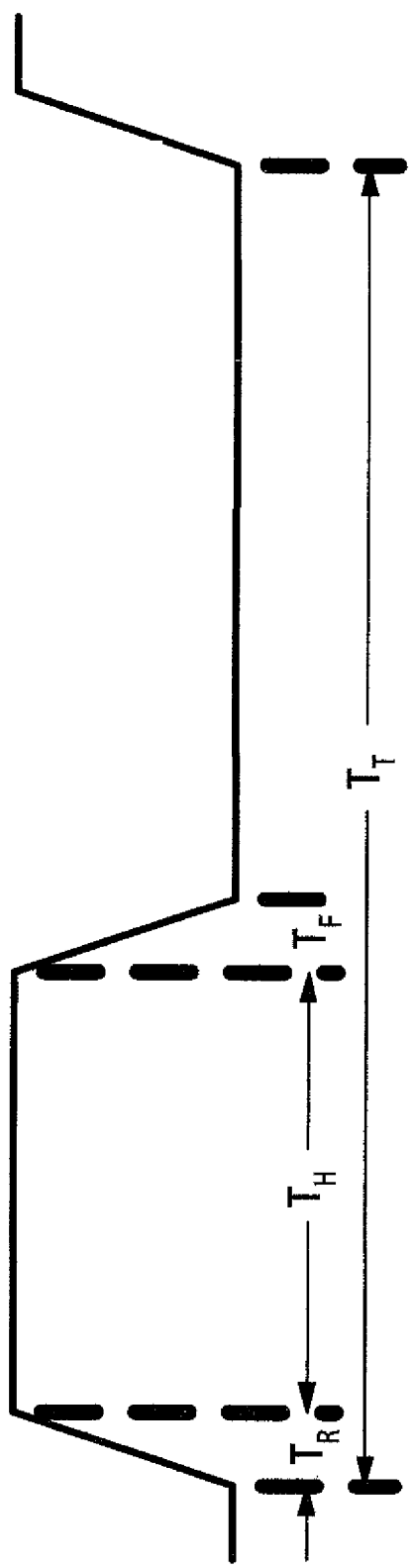
FIG. 7 is a timing diagram that may be used in accordance with one or more of the aforementioned embodiments.

FIG. 7 shows a GSM pulse current profile for the timing diagram of FIG. 5. Examples of values that may be used in this profile are set forth in Table 1.

TABLE 1

| PARAMETER | DESCRIPTION | MIN | TYP | MAX |
|---|---|---|---|---|
| $T_R$ | Rise time for battery current pulse for a typical GSM transmission burst from system RF power amplifier | | 10 μs | |
| $T_F$ | Fall time for battery current pulse for a typical GSM transmission burst from system RF power amplifier | | 10 μs | |
| $T_H$ | Duration of the battery current pulse for a typical GSM transmission burst from system RF power amplifier | 577 μs | | 2.31 ms |
| $T_T$ | Duration of the total period for a battery current pulse for a typical GSM transmission burst from system RF power amplifier | | 4.6 ms | |

When a large GSM pulse current (~1.7-2 A) exists, a voltage drop due to battery pack impedance could be about 400 mV depending on the series resistance from source to load. This is very large voltage drop just for the battery pack alone. On the system side, there are additional voltage drop due to interconnections such as connector, trace resistance, etc. To reduce this voltage drop, high-capacitance decoupling capacitors may be used. However, in order to achieve a measurable improvement, the capacitance value may have to be quite high, in the several mF range. Note that beside the high capacitance value, the capacitors may have to have low ESR (Equivalent Series Resistance) in the range of 10-20 mΩ to prevent DC voltage drop due to ESR.

According to one or more of the foregoing embodiments, real-time monitoring of the battery current is performed. This allows the control circuits of the mobile phone to compare the measured current output from the battery to the corresponding register values (e.g., BC1 and BC2) and to make the determination as to what action needs to be taken. The foregoing embodiments also perform 'glitch detection,' or hysteresis analysis, to eliminate negligible current events. Guidance for this glitch detection and general battery current monitoring considerations may be performed in accordance with the values in Table 2.

TABLE 2

| Area | Parameters/Requirements | Comments |
|---|---|---|
| Battery Current Limit Thresholds Programmability | Ability to program over a wide range of amperages with an estimated range of the low single digit amps. The register parameters are: BATTCURRENTLIMIT1 (BC1) BATTCURRENTLIMIT1 (BC2) | Set by register contents. |
| Time Limit until Actions Taken | Ability to program over a wide range of time in milliseconds. Need to have option to set limits to zero if absolute maximum with no time above battery current measurement is needed. The register parameters are: BATTTIMELIMIT1 (T1) BATTTIMELIMIT2 (T2) BATTTIMELIMIT3 (T3) | Set by register contents. |
| Battery Current Comparator Input Measurement Tolerance | When measuring battery current for BC1 and BC2 threshold violation, the circuit needs to have the ability to have about +/− 200 mA of tolerance. | Tightest accuracy at 3A setting is requested. |
| Battery Current Comparator "Glitch" Tolerance for Timer | Minimum Time of signal going below BATTCURRENTLIMIT1 (BC1) for system timer to reset is defined by the programmable parameter TbelowBC1 and should have a default setting of 2.2 millisecond. Maximum time for violation above BC2 measurement is defined by TaboveBC2 which has a default setting of 10 × 32 kHz clock. | |
| Battery Current Measurement Technique | Constantly monitored (as opposed to a specific sampling period.) Analog measurement of battery current across a sense resistor. | Left to supplier for details on implementation to minimize system leakage current. |

A list of the signals and non-limiting example values that may be used in accordance with one or more of the foregoing embodiments is set forth in Table 3.

TABLE 3

| Name | I/O | Type | Voltage | Description |
|---|---|---|---|---|
| GSMPULSE | I | DIGITAL | V180 | Input logic from the MODEM when in 2G mode as well as other modes. Active high signal. Logic 1 or 0 signal to the burst control unit configures the output response to the Audio, vibra, and camera flash circuits already described in the Current Sense Control Unit. This information is used to signify that the GSM is actively using the power amplifier and thus can mask (or gate) the audio, vibra, IA burst, and camera flash capabilities. This may be performed independently or in combination with other system information such as MSIC knowledge of the IA burst mode. |
| TXPWRTH | I | DIGITAL | V180 | Input logic from the MODEM when in 2G or another mode. Active high signal. Indicates that the MODEM Transmit power has exceeded a preset TX power threshold. Logic 1 or 0 signal to the burst control unit configures the output response to the Audio, vibra, and camera flash circuits in advance of the GSM Pulse going high. The timing of the pulse is programmable inside the modem, but assumptions made at the MSIC burst control unit are that this signal can be used to set up system level response to high current GSM pulses well in advance of the GSM Pulse. Since this signal is also intended to be supplied to the processor via GPIO, the usage here is expected to be backup only in case of system timing issue. |
| IABURST (via SVID virtual pin) | I | DIGITAL | V180 | Input logic from the processor via virtual pin on SVID. This input can be acquired by data packet transmission across the SVID interface. The existence of CPU burst mode is contained in virtual pin bit position 6, and is expected to be set or disabled whenever the CPU is requested to go into or out of burst mode, which is accompanied by a change in system frequency and therefore, voltage. This signal will need to be latched once received for proper combination logic application to happen. Logic 0 = normal CPU mode, logic 1 = CPU in burst mode. |
| CAMFLHD# | O | DIGITAL | V180 | The Camera Flash output may control the camera LED or Xenon flash charge or flash control circuit. Anytime the system is above the BC1 limit, it seems appropriate to limit the camera flash output. Similarly, as a preventive measure, we have added the logical OR gate to allow GSM pulsing to modulate the Camera Flash output. This option needs to have the capability to be turned off. |
| SYSBURSTDISABLE# | O | DIGITAL | V180-OD | System Burst disable may be activated at timer violation T1 and T2. The reason for this is at T1, we expect that this signal will be tied to a processor GPIO and used for OSPM knowledge to do something about the over current situation. This is also activated at time T2, since under this situation hardware circuits need to manually shut down system level devices that take high current (if configured to do so). In order to activate this signal, a timer violation OVERT1, OVERT2 will have need to be set a status bit and send an interrupt to the CHRINT register. |

TABLE 3-continued

| Name | I/O | Type | Voltage | Description |
|---|---|---|---|---|
| PROCHOT# | O | DIGITAL | V180-OD | Output to processor PROCHOT pin to signify that IA burst must be disabled and system configured for LFM mode. May be used with SYSBURSTDISABLE and MSIC interrupt (SVID) capabilities to denote what happened. Sending this signal may also trigger an interrupt to the SCU by way of a timer violation. This signal is also referenced as SOCBURSTDISABLE. |
| VIBRA-DISABLE# | Output from BCU, internal to MSIC | DIGITAL | V180 | Logic 1 or 0 signal to the vibrator enable gates, to shut down the ability to use the vibrators temporarily. |
| AUDIO-VOLUME-CRUSH# | Output from BCU, internal to MSIC | DIGITAL | V180 | Logic 1 or 0 Signal Sent to the audio volume control subsystem to limit the system audio volume. |

In Table 3, V180 may equal 1.8 volts and V180-OD may equal 1.8 volt, with open drain capability.

Tables 4-10 show examples of register requirements, bit values, and other parameters that may be used for controlling power using the Burst Control Unit in accordance with one or more embodiments of the present invention.

TABLE 4

| Register Name | R/W | D7 | D6 | D5 | D4 | D3 | D2 | D1 |
|---|---|---|---|---|---|---|---|---|
| BATTCURRENTLIMIT12 | R/W | RSVD | RSVD | | BATTLECURRENTLIMIT2(2:0) | | | |

| Bit Name | Function | |
|---|---|---|
| RSVD | | n/a |
| RSVD | | n/a |
| BATTLECURRENTLIMIT2(2:0) | BC2: The maximum battery current limit threshold at which system and SOC burst disable functions are activated and the system is told to shut down. | Bits[2:0] 000 001 010 011 100 101 110 111 |
| BATTLECURRENTLIMIT1(2:0) | BC2: The minimum battery current limit threshold at which system is triggered into events to control burst current in an attempt to bring system current consumption down.. | Bits[2:0] 000 001 010 011 100 101 110 111 |

TABLE 5

| Register Name | R/W | D7 | D6 | D5 | D4 | D3 | D2 | D1 | D0 |
|---|---|---|---|---|---|---|---|---|---|
| BATTTIMELIMIT12 | R/W | | BATTTIMELIMIT2[3:0] | | | | BATTTIMELIMIT1[3:0] | | |

| Bit Name | Function | Logic | |
|---|---|---|---|
| BATTTIMETLIMIT2 [3:0] | The time limit (T2) above BC1 current limit threshold at which the system is triggered into MSIC hardware control to bring system current consumption down. This includes pulling PROCHOT. | [3:0] 0000 0001 0010 0011 0100 0101 0110 0111 1000 1001 1010 1011 1100 1101 1110 1111 | milliseconds 0.2 ms 0.7 ms 1.2 ms 1.7 ms 2.2 ms 2.7 ms 3.2 ms 3.7 ms 4.2 ms 4.7 ms 5.2 ms 5.7 ms 6.2 ms 6.7 ms 7.2 ms 7.7 ms |

TABLE 5-continued

| | | | |
|---|---|---|---|
| BATTTIMETLIMIT1 [3:0] | The time limit (T1) above BC1 current limit threshold at which the system is triggered into events such as GPIO and INT notification in an attempt to let SW bring current consumption down. | 0000 | 0.2 ms |
| | | 0001 | 0.7 ms |
| | | 0010 | 1.2 ms |
| | | 0011 | 1.7 ms |
| | | 0100 | 2.2 ms |
| | | 0101 | 2.7 ms |
| | | 0110 | 3.2 ms |
| | | 0111 | 3.7 ms |
| | | 1000 | 4.2 ms |
| | | 1001 | 4.7 ms |
| | | 1010 | 5.2 ms |
| | | 1011 | 5.7 ms |
| | | 1100 | 6.2 ms |
| | | 1101 | 6.7 ms |
| | | 1110 | 7.2 ms |
| | | 1111 | 7.7 ms |

TABLE 6

| Register Name | R/W | D7 | D6 | D5 | D4 | D3 | D2 | D1 | D0 |
|---|---|---|---|---|---|---|---|---|---|
| BATTTIMELIMIT3 | R/W | RSVD | RSVD | RSVD | RSVD | BATTTIMELIMIT3[3:0] | | | |

| Bit Name | Function | Logic | |
|---|---|---|---|
| RSVD | | n/a | n/a |
| RSVD | | n/a | n/a |
| RSVD | | n/a | n/a |
| SPARE | | n/a | n/a |
| BATTTIMELIMIT3[3:0] | The time limit (T3) above BC1 current limit threshold at which the system is triggered into hardware shutdown event and is equivalent to battery over current. | [3:0] | milliseconds |
| | | 0000 | 0.2 ms |
| | | 0001 | 1 ms |
| | | 0010 | 2 ms |
| | | 0011 | 3 ms |
| | | 0100 | 4 ms |
| | | 0101 | 5 ms |
| | | 0110 | 6 ms |
| | | 0111 | 7 ms |
| | | 1000 | 8 ms |
| | | 1001 | 9 ms |
| | | 1010 | 10 ms |
| | | 1011 | 11 ms |
| | | 1100 | 12 ms |
| | | 1101 | 13 ms |
| | | 1110 | 14 ms |
| | | 1111 | 15 ms |

TABLE 7

| Register Name | R/W | D7 | D6 | D5 | D4 | D3 | D2 | D1 | D0 |
|---|---|---|---|---|---|---|---|---|---|
| BATTTIMEDB | R/W | TBELOWBC1[3:0] | | | | RSVD | RSVD | TBELOWBC2[3:0] | |

| Bit Name | Function | Logic | |
|---|---|---|---|
| TBELOWBC1[3:0] BATTTIMELIMIT3[3:0] | Minimum Time of signal going below BATTCURRENTLIMIT1(BC1) for system timer to reset is defined by the programmable parameter TbelowBC1 and should have a default setting of TBD millisecond. | [3:0] | milliseconds |
| | | 0000 | 0.2 ms |
| | | 0001 | 0.4 ms |
| | | 0010 | 0.6 ms |
| | | 0011 | 0.8 ms |
| | | 0100 | 1 ms |
| | | 0101 | 1.2 ms |
| | | 0110 | 1.4 ms |
| | | 0111 | 1.6 ms |
| | | 1000 | 1.8 ms |
| | | 1001 | 2 ms |
| | | 1010 | 2.2 ms |
| | | 1011 | 2.4 ms |
| | | 1100 | 2.6 ms |
| | | 1101 | 2.8 ms |
| | | 1110 | 3 ms |
| | | 1111 | 3.2 ms |

TABLE 7-continued

| | | | |
|---|---|---|---|
| RSVD | | n/a | n/a |
| RSVD | | n/a | n/a |
| TABOVEBC2[1:0] | Time the current is allowed above BC2 threshold for debounce purposes before the overcurrent for the battery is initiated. | Bits[1:0] | Mid Range Setting |
| | | 00 | 328 us (10x 32 kHZ clock) |
| | | 01 | 524 us (16x 32 kHZ clock) |
| | | 10 | 1049 us (32x 32 kHZ clock) |
| | | 11 | 2097 us (64x 32 kHZ clock) |

TABLE 8

| Register Name | R/W | D7 | D6 | D5 | D4 | D3 | D2 | D1 | D0 |
|---|---|---|---|---|---|---|---|---|---|
| BRSTCONFIG OUTPUTS | R/W | SPARE | SPARE | SPARE | CAMOUTEN | SYSOUTEN | SOCOUTEN | VIBOUTEN | AUDOUTEN |

| | | Logic | |
|---|---|---|---|
| Bit Name | Function | 0 | 1 |
| SPARE | | n/a | n/a |
| SPARE | | n/a | n/a |
| SPARE | | n/a | n/a |
| CAMOUTEN | ENABLECAMERAFLASHFUNCTION: this enables or disables the final output of the combinatorial logic to the system. | disabled | enabled |
| SYSOUTEN | ENABLESYSBRSTFUNCTION: this enables or disables the final output of the combinatorial logic to the system. | disabled | enabled |
| SOCOUTEN | ENABLESOCBRSTFUNCTION: this enables or disables the final output of the combinatorial logic to the system. | disabled | enabled |
| VIBOUTEN | ENABLEVIBRACNTRLFUNCTION: this enables or disables the final output of the combinatorial logic to the system. | disabled | enabled |
| AUDOUTEN | ENABLEAUDIOCNTRLFUNCTION: this enables or disables the final output of the combinatorial logic to the system. | disabled | enabled |

TABLE 9

| Register Name | R/W | D7 | D6 | D5 | D4 | D3 | D2 | D1 | D0 |
|---|---|---|---|---|---|---|---|---|---|
| BRSTCONFIG ACTIONS | R/W | SPARE | IABACTEN | TXPACTEN | GSMACTEN | SYSACTEN | SOCACTEN | VIBACTEN | AUDACTEN |

| | | Logic | |
|---|---|---|---|
| Bit Name | Function | 0 | 1 |
| SPARE | | n/a | n/a |
| IABACTEN | enable or disable the ability of IABURST signal to be used in combinatorial logic | disabled | enabled |
| TXPACTEN | enable or disable the ability of TXPRWTH# signal to be used in combinatorial logic | disabled | enabled |
| GSMACTEN | enable or disable the ability of GSM pulse to mask Camera Flash operation | disabled | enabled |
| SYSACTEN | enable or disable the ability of the battery current timer limits to control the SYSTEM BURST DISABLE# function. Overcurrent BC2 still has the capability to control if output gate is enabled. | disabled | enabled |
| SOCACTEN | enable or disable the ability of the battery current timer limits to control the PROCHOT# or SOC BURST DISABLE# function. Overcurrent BC2 still has the capability to control if output gate is enabled. | disabled | enabled |
| VIBACTEN | enable or disable the ability of the battery current timer limits to control the VIBRATOR DISABLE function. Overcurrent BC2 still has the capability to control if output gate is enabled. | disabled | enabled |
| AUDACTEN | enable or disable the ability of the battery current timer limits to control the AUDIO VOLUME CRUSH function. Overcurrent BC2 still has the capability to control if output gate is enabled. | disabled | enabled |

TABLE 10

| Register Name | R/W | D7 | D6 | D5 | D4 | D3 | D2 | D1 | D0 |
|---|---|---|---|---|---|---|---|---|---|
| BURSTCONTROLSTATUS | R/W | OVERT3 | OVERT2 | OVERT1 | CAMSTAT | SYSSTAT | SOCSTAT | VIBSTAT | AUDSTAT |

| | | Logic | |
|---|---|---|---|
| Bit Name | Function | 0 | 1 |
| OVERT3 | Timer 3 violation. Latch the signal here for status. Was action taken for this subsystem? No = logic 0, yes = logic 1. Write 0 to clear. | no | yes |
| OVERT2 | Timer 2 violation. Latch the signal here for status. Was action taken for this subsystem? No = logic 0, yes = logic 1. Write 0 to clear. | no | yes |
| OVERT1 | Timer 1 violation. Latch the signal here for status. Was action taken for this subsystem? No = logic 0, yes = logic 1. Write 0 to clear. | no | yes |
| CAMSTAT | Camera action taken status. Latched signal from combinatorial logic. Was action taken for this subsystem? No = logic 0, yes = logic 1 at point shown on combo logic diagram. | no | yes |
| SYSSTAT | System Burst Disable action taken status. Latched signal from combinatorial logic. Was action taken for this subsystem? No = logic 0, yes = logic 1 at point shown on combo logic diagram. | no | yes |
| SOCSTAT | PROCHOTR or SOC Bust Disable action taken status. Latched signal from combinatorial logic. Was action taken for this subsystem? No = logic 0, yes = logic 1 at point shown on combo logic diagram. | no | yes |
| VIBSTAT | Vibra disable action taken status. Latched signal from combinatorial logic. Was action taken for this subsystem? No = logic 0, yes = logic 1 at point shown on combo logic diagram. | no | yes |
| AUDSTAT | Audio volume crush action taken status. Latched signal from combinatorial logic. Was action taken for this subsystem? No = logic 0, yes = logic 1 at point shown on combo logic diagram. | no | yes |

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. A power management system, comprising:
   a timer;
   a sensor to detect current output from a battery; and
   a first comparator to compare the battery current to a first reference value; and
   a controller to perform a first power control operation based on said comparison, wherein the first power control operation is to reduce power consumed by the battery in order to cause the battery current to fall below the first reference value, and wherein the first power control operation is to be performed when the battery current equals or exceeds the first reference value for a first predetermined period of time counted by the timer.

2. The system of claim 1, wherein the first power control operation is to shut down or to reduce power to one or more functions of a host system to which the battery supplies power, when the battery current equals or exceeds the first reference value for the first predetermined period of time.

3. The system of claim 2, wherein the controller is to perform a second power control operation when the battery current equals or exceeds the second reference value for a second predetermined period of time counted by the timer, wherein the second power control operation is different from the first power control operation.

4. The system of claim 3, wherein the second power control operation is to at least temporarily shut down power to the host system.

5. The system of claim 4, further comprising:
   a second comparator to compare the battery current to a second reference value which is greater than the first reference value.

6. The system of claim 5, wherein the first reference value is a predetermined level below a maximum current capability of the host system and the second reference value corresponds to a predetermined maximum allowable current to the host system, which is lower than the maximum current capability of the host system.

7. The system of claim 2, wherein the host system includes a mobile phone.

8. The system of claim 7, wherein the first power control operation is to shut down power to a camera flash circuit of the mobile phone.

9. The system of claim 7, wherein the first power control operation is to reduce volume of an audio circuit of the mobile phone.

10. The system of claim 7, wherein the first power control operation is to reduce or is to shut down power to a vibration circuit of the mobile phone.

11. The system of claim 2, further comprising:
a check circuit to determine whether a rise in battery current is caused by a hysteresis or other temporary effect, the controller to prevent the first power control operation from being performed if the battery current rise is determined by the check circuit to be caused by hysteresis or said other temporary effect.

12. The system of claim 11, wherein the check circuit is coupled between the first comparator and the controller.

13. The system of claim 2, wherein information corresponding to the first reference value and the first predetermined period of time are to be stored in programmable registers included in or coupled to the host system.

14. A power management method, comprising:
detecting current output from a battery;
comparing the battery current to a first reference value; and
performing a first power control operation based on said comparison,
wherein said performing includes measuring a time the battery current equals or exceeds the first reference value, wherein the first power control operation is performed when the current equals or exceeds the first reference value for a first predetermined period of time, and wherein the power control operation reduces power consumed by the battery in order to cause the battery current to fall below the first reference value.

15. The method of claim 14, wherein the first power control operation shuts down or reduces power to one or more functions of a host system to which the battery supplies power, when the battery current equals or exceeds the first reference value for the first predetermined period of time.

16. The method of claim 15, wherein the burst controller is to perform a second power control operation when the battery current equals or exceeds the second reference value for a second predetermined period of time, wherein the second power control operation is different from the first power control operation.

17. The method of claim 16, wherein the second power control operation at least temporarily shuts down power to the host system.

18. The method of claim 15, wherein the host system includes a mobile phone.

19. The method of claim 18, wherein the first power control operation shuts down power to a camera flash circuit of the mobile phone.

20. The method of claim 18, wherein the first power control operation reduces volume of an audio circuit of the mobile phone.

21. The method of claim 18, wherein the first power control operation reduces or shuts down power to a vibration circuit of the mobile phone.

22. A portable electronic device, comprising:
a battery; and
a power control system including:
(a) a sensor to detect current output from a battery;
(b) a first comparator to compare the battery current to a first reference value; and
(c) a controller to perform a first power control operation based on said comparison, wherein the power control operation reduces power consumed by the battery in order to cause the battery current to fall below the first reference value, and wherein the first power control operation is to be performed when the battery current equals or exceeds the first reference value for a first predetermined period of time counted by a timer.

23. The device of claim 22, wherein the device corresponds to or includes a mobile phone.

24. A power management system, comprising:
a sensor to detect current output from a battery;
a comparator to compare the battery current to a reference value; and
a controller to perform a power control operation based on said comparison,
wherein the power control operation is to reduce power consumed by the battery in order to cause the battery current to fall below the reference value, wherein the power control operation is to selectively reduce power to a first circuit or function to be powered by the battery and simultaneously to maintain power to a second circuit or function to be powered by the battery.

25. The system of claim 24, wherein the power control operation is to selectively reduce power to the first circuit or function to a non-zero level.

26. The system of claim 24, wherein the power control operation is to selectively shut off power to the first circuit or function.

27. The system of claim 24, wherein the first circuit or function is to perform within a first range before the power is to be selectively reduced and is to perform within a second range after the power is to be selected reduced, and at least one value in the second range is lower than all values in the first range.

28. The system of claim 24, further comprising:
a timer;
wherein the power control operation is to be performed when the battery current equals or exceeds the reference value for a first predetermined period of time counted by the timer.

29. A portable electronic device, comprising:
a battery; and
a power control system including:
(a) a sensor to detect current output from a battery;
(b) a comparator to compare the battery current to a reference value; and
(c) a controller to perform a power control operation based on said comparison, wherein the power control operation is to reduce power consumed by the battery in order to cause the battery current to fall below the reference value, wherein the power control operation is to selectively reduce power to a first circuit or function to be powered by the battery and simultaneously to maintain power to a second circuit or function to be powered by the battery.

30. The device of claim 29, wherein the power control operation is to selectively reduce power to the first circuit or function to a non-zero level.

31. The device of claim 29, wherein the power control operation is to selectively shut off power to the first circuit or function.

32. The device of claim 29, wherein the first circuit or function is to perform within a first range before the power is to be selectively reduced and is to perform within a second range after the power is to be selected reduced, and at least one value in the second range is lower than all values in the first range.

33. The device of claim 32, wherein at least one of the first circuit or function or the second circuit or function is to correspond to a camera flash, an audio output level, or a vibration rate.

34. The device of claim 33, wherein the first and second ranges are to include different values of vibration rate, audio output level, or camera flash brightness for said at least one of the first circuit or function or the second circuit or function.

* * * * *